(12) United States Patent
Karbasi et al.

(10) Patent No.: US 9,216,548 B2
(45) Date of Patent: Dec. 22, 2015

(54) REMOVING VOLATILE COMPOUNDS FROM POLYMER PELLETS

(75) Inventors: Amir Karbasi, Espoo (FI); Esa Korhonen, Porvoo (FI); Ensio Hietanen, Tolkkinen (FI); Karin H. Knudsen, Porsgrunn (NO); Kai Hagane, Langesund (NO); Fred Bergmann, Skien (NO); Klaus Nyfors, Porvoo (FI)

(73) Assignee: BOREALIS TECHNOLOGY OY, Porvoo (FI)

( * ) Notice: Subject to any disclaimer, the term of this patent is extended or adjusted under 35 U.S.C. 154(b) by 1085 days.

(21) Appl. No.: 12/746,081

(22) PCT Filed: Oct. 24, 2008
(Under 37 CFR 1.47)

(86) PCT No.: PCT/EP2008/009029
§ 371 (c)(1),
(2), (4) Date: Apr. 19, 2011

(87) PCT Pub. No.: WO2009/077031
PCT Pub. Date: Jun. 25, 2009

(65) Prior Publication Data
US 2011/0245445 A1    Oct. 6, 2011

(30) Foreign Application Priority Data

Dec. 18, 2007 (EP) .................................. 07024555

(51) Int. Cl.
| | | |
|---|---|---|
| C08F 210/00 | (2006.01) |
| B29C 71/00 | (2006.01) |
| B29B 9/16 | (2006.01) |
| C08F 6/00 | (2006.01) |
| B29K 23/00 | (2006.01) |

(52) U.S. Cl.
CPC ............. B29C 71/0009 (2013.01); B29B 9/16 (2013.01); C08F 6/005 (2013.01); *B29C 2071/0027* (2013.01); *B29C 2071/0036* (2013.01); *B29K 2023/12* (2013.01)

(58) Field of Classification Search
CPC .................................. C08F 6/005; C08F 6/008
USPC .......................................................... 526/348
See application file for complete search history.

(56) References Cited

U.S. PATENT DOCUMENTS

| | | | |
|---|---|---|---|
| 2,918,701 A * | 12/1959 | Schrader et al. .............. 264/142 |
| 3,931,130 A | 1/1976 | Beining |
| 4,698,395 A | 10/1987 | Inoue et al. |
| 5,532,335 A | 7/1996 | Kimball et al. |
| 7,250,486 B1 | 7/2007 | McGehee |
| 2005/0256297 A1 | 11/2005 | Gupta et al. |

FOREIGN PATENT DOCUMENTS

| | | |
|---|---|---|
| DE | 44 37 042 | 4/1996 |
| DE | 197 29 302 | 1/1999 |
| EP | 0 808 850 | 11/1997 |
| WO | WO 95/35323 | 12/1995 |
| WO | WO 98/40417 | 9/1998 |
| WO | WO 2006/067146 | 6/2006 |
| WO | WO 2006/077214 | 7/2006 |

OTHER PUBLICATIONS

Gala Industries, Inc.'s brochure titled "*Underwater Pelletizers*", 2004.
Sax, N. Irving et al., *Hawley's Condensed Chemical Dictionary, Eleventh Edition*, 1987, Library of Congress Catalog Card No. 86-23333 ISBN: 0-442-28097-1, p. 1047.
International Search Report mailed Jan. 23, 2009 for International application No. PCT/EP2008/009029.
Written Opinion of the International Searching Authority mailed Jan. 23, 2009 for International application No. PCT/EP2008/009029.
International Preliminary Report on Patentability mailed Jan. 28, 2010 for International application No. PCT/EP2008/009029.

* cited by examiner

*Primary Examiner* — Wenwen Cai
(74) *Attorney, Agent, or Firm* — Fay Sharpe LLP

(57) ABSTRACT

The invention is directed to a process for the treatment of plastic material comprising a) providing a liquid; b) contacting the plastic material with the liquid; c) keeping the plastic material in the liquid at Tb−25° C. to Tb of the liquid, wherein Tb is the boiling point of the liquid at the applied pressure; and d) removing the plastic material from the liquid. Furthermore, the invention is directed to the use of a liquid for the treatment of plastic material and to a plant for treating plastic material with a liquid.

3 Claims, 5 Drawing Sheets

REMOVING VOLATILE COMPOUNDS FROM POLYMER PELLETS

FIELD OF THE INVENTION

Figure 1:
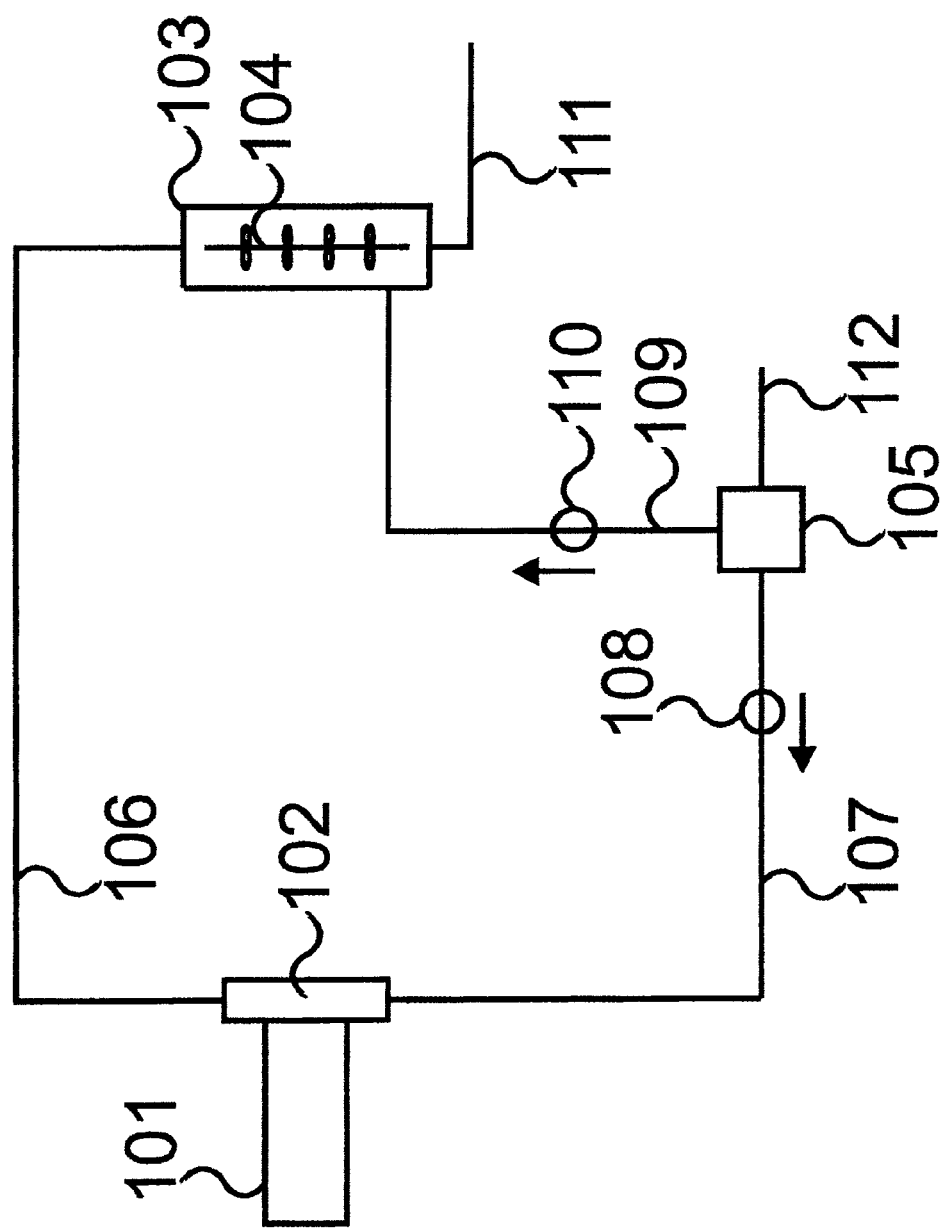

The invention relates to a process for treatment of plastic material, to the use of a liquid for the removal of volatile components from plastic material and to a plant for removing volatile components from plastic materials.

BACKGROUND OF THE INVENTION

It is known from WO 98/40417 to eliminate smell from polymers by purging the steam or inert gas or air at elevated temperature. It is furthermore known from DE 19 729 302 that polypropylene granules can be separated from water and dried at 100 to 130° C. for dehydration.

The treatment of polymers pellets such as polypropylene and polyethylene with steam and inert gas or air at elevated temperature nevertheless causes several problems. First of all, emissions, taste and odour are not sufficiently improved for a number of applications particularly in the field of drinking water pipes and automobile parts. Standard purging furthermore only removes the monomer content to a low extent from the plastic material, whereby high amounts of volatile components remain in the material. This problem is particularly important when the polymer is subjected to visbreaking for modifying the melt index of the polymer. During storage of such polymers, the loss of volatile components from the surface of the pellets may even lead to explosive mixtures with air in the storage silos.

SUMMARY OF THE INVENTION

It is an object of the invention to provide a process, which allows a simplified and effective removal of volatile components with low energy consumption. It is a further object of the invention to provide a plant for carrying out such a process.

The present invention is based on the finding that these objects can be achieved by contacting plastic material with a solvent in liquid form.

The present invention therefore provides a process for the treatment of plastic material comprising
a) providing a liquid;
b) contacting the plastic material with the liquid;
c) keeping the plastic material in the liquid at $T_b-25°$ C. to $T_b$, preferably $T_b-10°$ C. to $T_b$ of the liquid, wherein $T_b$ is the boiling point of the liquid at the applied pressure; and
removing the plastic material from the liquid.

The present invention additionally provides a plant for removing volatile components from plastic material comprising
(a) an extruder for extruding olefin polymers;
(b) a pelletiser adjacent to extruder;
(c) a treatment tank or a group of treatment tanks for degassing of the polymer;
The term "treatment tank" defines any vessel suitable for the treatment of plastic material with a liquid.
(d) optionally a stirrer having at least one mixing element within the treatment tank or the group of treatment tanks;
(e) a liquid tank or a group of liquid tanks;
(f) a conduit or a group of conduits for transporting the pellet slurry, obtained from pelletiser to treatment tank or to the group of treatment tanks;
(g) a conduit or a group of conduits for connecting the liquid tank or the group of liquid tanks with pelletiser;
(h) pumping means for establishing a liquid flow along conduit or the group of conduits, connecting the liquid tank or the group of liquid tanks with pelletiser;
(i) a conduit or a group of conduits for connecting the liquid tank or the group of liquid tanks with the treatment tank or the group of treatment tanks;
(k) pumping means for establishing a liquid flow along the conduit or the group of conduits for connecting the liquid tank or the group of liquid tanks with the treatment tank or the group of treatment tanks;
(k) a conduit or a group of conduits for the withdrawal of the pellet slurry from the treatment tank or from each of the group of treatment tanks and
(m) a conduit or a group of conduits for feeding liquid from a liquid source into the liquid tank or the group of liquid tanks.

The use of a liquid instead of steam according to the invention not only removes volatile components more efficiently from the plastic material, it furthermore facilitates the process. The pellets may remain in the same liquid from the extruder via the degassing (=treatment) step to the final drying step. In other processes for removing volatile components normally the hot polymer pellets are pneumatically conveyed which often results in generation of unwanted fines and streamers due to friction between the particles and the conveying pipe. The use of a slurry reduces the generation of said fines and streamers. Further, liquids, even when they are hot, are easier and safer to handle than pure steam as used in the prior art processes. Furthermore, steam has to be condensed for subsequent waste-water treatment. In the inventive process and plant vaporized liquid may be used to heat the liquid, whereby the amount of vaporized liquid which has to be recondensed is much less compared with prior art processes. Therefore less cooling water is necessary resulting in a less energy-consuming process. Energy savings additionally originate from the facilitated heat transfer from liquid to solid plastic material compared to the heat transfer from gas to solid plastic material. Additional advantages of the invention can be obtained as far as water is used as the liquid. In this case it is much easier to work along directive 1999/13/EC of the European Union for the limitation of emissions of volatile organic compounds.

The present invention furthermore is concerned with the use of a liquid for removal of volatile components from plastic materials, whereby the liquid has a temperature of $T_b-25°$ C. to $T_b$, preferably $T_b-10°$ C. to $T_b$ wherein $T_b$ is the boiling point of the liquid at the applied pressure.

The invention particularly is concerned with the removal of volatile components from pellets as produced during production of plastic material. These volatile components comprise monomers, hydrocarbons and hydrocarbon derivatives including substituted hydrocarbons, alcohols, ketones, aldehydes, carboxylic acids, amines, imines, epoxydes, ethers, and derivatives thereof. The process particularly removes volatile components containing 2 to 20 carbon atoms, preferably 2 to 15 carbon atoms, more preferably 2 to 12 carbon atoms and most preferably 6 to 12 carbon atoms. Preferably the removed volatile components essentially consist of hydrocarbons having 2 to 20 carbon atoms preferably 2 to 15 carbon atoms, more preferably 2 to 12 carbon atoms and most preferably 6 to 12 carbon atoms. In this respect "essentially consist" means 50 to 100%, preferably 80 to 100% of the total removed volatile components.

Preferably the components that are removed have a boiling point up to 360° C., more preferably from −104° C. to 280° C. and most preferably from 65° C. to 230° C.

In this application the terms "degassing" and "treatment" are used synonymous.

The volatile components may of course comprise other substances emanating from components commonly used in the production of plastics, such as additives, fillers or modifiers.

The process according to the present invention has a higher efficiency as regards the amount and nature of extracted volatile components. These volatile components comprise monomers, hydrocarbons and hydrocarbon derivatives including substituted hydrocarbons, alcohols, ketones, aldehydes, carboxylic acids, amines, imines, epoxydes, ethers, and derivatives thereof. The process particularly removes volatile components containing 2 to 20 carbon atoms, preferably 2 to 15 carbon atoms, more preferably 2 to 12 carbon atoms and most preferably 6 to 12 carbon atoms. Preferably the removed volatile components essentially consist of hydrocarbons having 2 to 20 carbon atoms preferably 2 to 15 carbon atoms, more preferably 2 to 12 carbon atoms and most preferably 6 to 12 carbon atoms. In this respect "essentially consist" means 50 to 100%, preferably 80 to 100% of the total removed volatile components. Preferably components are removed with a boiling point up to 360° C., more preferably from −104° C. to 280° C. and most preferably from 65° C. to 230° C.

The heat transfer to the polymer material is moreover improved, whereby the energy efficiency is improved. It has been surprisingly discovered that it is not necessary to apply massive amounts of air or inert gas as in the standard process for removal of residual hydrocarbons.

The plastic material to be treated in the process according to the present invention can be any plastic material suffering from unwanted emissions, taste and odour. Preferably the plastic material is polyolefin such as based on $C_2$, $C_3$ and $C_4$ to $C_8$ monomers and more preferably is a polyethylene and/or a polypropylene resin also including additional amounts of functionalised monomers and/or $C_4$ to $C_{10}$ comonomers.

The process according to the present invention is particularly advantageous in the case of polypropylene resins which have been subjected to visbreaking.

The temperature of the liquid has to be selected within a certain temperature range. This range starts at a temperature 25° C., preferably 10° C. below the boiling point of the liquid and ends at the boiling point of the liquid at the applied pressure.

In the case of water, the lower limit of the temperature range is 75° C., preferably 90° C. and the upper limit is 100° C. at the standard pressure. It is well understood that at higher pressure, the usable temperature range is shifted to higher temperatures. Applying such higher temperatures is preferred in the case of higher melting polypropylene resins, such as in the case of polypropylene which was subjected to visbreaking.

After keeping the plastic material in the liquid at the temperature within the range mentioned above for certain time, the plastic material is removed from the liquid.

The liquid according to the present invention is preferably selected from water, ethanol, propanol, isopropanol, butanol and mixtures thereof. More preferably, the liquid is selected from water or mixtures of: water/ethanol, water/propanol, water/isopropanol, water/butanol in a ratio of from 4/1 to 19/1.

Most preferably, the liquid is water. The finding that water is suitable for this purpose is particularly surprising, since the solubility of monomers and $C_2$-$C_{20}$ hydrocarbons in water is very low, whereby the process is not a standard extraction.

Preferably the plastic material is kept in the liquid for a time from about 15 minutes to 6 hours. More preferably, plastic material is kept in the liquid for 20 minutes to 4 hours and most preferably from 30 minutes to 4 hours.

The process according to the present invention is preferably applied when plastic material is in the form of pellets. Pellets are usually obtained in an underwater cutter. The water used in the underwater cutter usually has a temperature of about 40 to 60° C. This advantageously can be used in the present invention as a pre-warming of the liquid to be used in the inventive process. It is possible to use the water in the underwater cutter directly or to use a heat exchanger. The integrated process in both cases significantly reduces the necessary energy input.

Integration even provides further advantages. Conventionally processes for removing volatile components normally include pneumatic conveying of hot polymer particles which often results in generation of unwanted fines and streamers due to friction between the particles and conveying pipe. As the present volatile removal process takes place in slurry the present process offers the great advantage of heavily reduced generation of fines and streamers. In the case of treating pellets, it is furthermore a great advantage that the pellets do not have to be subjected to a drying step, but can be used in an liquid slurry (=pellet slurry) preferably the pellet slurry is an aqueous slurry.

In the inventive process the temperature of the liquid preferably is maintained within the desired temperature range for a certain time. This can be achieved by any means known to the person skilled in the art; preferably this is achieved by injecting vaporised liquid into the liquid or by heating coils.

More preferably, this is done by injecting vaporised liquid selected from water, ethanol, propanol, isopropanol, butanol and mixtures thereof into the liquid. Even more preferably, the vaporised liquid is selected from water or mixtures of: water/ethanol, water/propanol, water/isopropanol, water/butanol in a ratio of from 4/1 to 19/1.

Most preferably the warming is carried out by injection of steam into the liquid. The bubbles introduced by the injection of steam enhance the purging of the boiling liquid and the removal of hydrocarbons.

Preferably the process according to the present invention can be combined with the injection of an air stream or an inert gas stream into the overhead compartment of the treatment tank or directly into the slurry.

More preferably an inert gas stream is injected into the overhead compartment of the treatment tank or directly into the slurry.

Depending on the plastic material to be treated, it is advantageous to apply an overpressure, such as that water at 75° C. to 160° C., preferably 90° C. to 150° C., more preferably 105° C. to 145° C. and most preferably 110° C. to 140° C. is present in liquid form.

The process according to the present invention can be carried out in batch mode or in continuous form. When being carried out in continuous form, a counter current continuous flow vessel or a stirred vessel, where the residence time distribution is determined by the flow pattern caused by the streams entering and leaving the vessel or by the stirrer in combination with the streams entering and leaving the vessel, is preferably used.

The liquid/plastic material weight ratio both in case of the batch mode and the continuous mode is preferably within the range of 3/10 and 300/10, more preferably within the range of 3/10 and 200/10, even more preferably within the range of 5/10 and 200/10, even more preferably within the range of 10/10 and 150/10. Most preferably, the liquid/plastic material weight ratio is within the range of 15/10 and 120/10. In the case of pellets, the liquid quantity is preferably kept at 5-200 vol. %, more preferably at 5-100 vol. % above the theoretical minimum to fill the volume between the pellets.

The process according to the present invention can be combined with a hydraulic pellet transport system known in the art. Such a combination allows an integrated process which has further advantages of avoiding additional drying steps and avoiding costly safety precautions such as storage under inert gas in a silo to be taken otherwise.

Preferably the plastic material is dried and/or treated by inert gas at temperatures above room temperature after removal of the liquid. This removal can be carried out by centrifugal dryers and the like known in the art. More preferably the removal of water is accomplished stepwise. Preferably 40 to 98% and more preferably 70 to 95% of the degassing water is separated after the treatment according to the present invention.

The reduction of volatile components is based on the total emission of the untreated polymer. If not mentioned otherwise, all emission data has been determined according to method (A) as described in the experimental part.

The chemical nature and amount of the volatiles is of course dependent on the comonomers and additives used and the process employed.

The process of the current invention is characterised by a removal of total volatile components after one hour of at least 20 wt. %, preferably at least 30 wt. %, more preferably at least 40 wt. % and most preferably at least 45 wt. %, further characterised by a removal after one hour of at least 20 wt. %, preferably at least 30 wt. %, more preferably at least 40 wt. % and most preferably at least 48 wt. % of the fraction <C6.

The process of the current invention is further characterised by a removal of total volatile components after four hours of at least 40 wt. %, preferably at least 50 wt. %, more preferably at least 60 wt. % and most preferably at least 71 wt. %, further characterised by a removal after four hours of at least 40 wt. %, preferably at least 50 wt. %, more preferably at least 60 wt. %, even more preferably at least 70 wt. %, even more preferably at least 80 wt. % and most preferably at least 85 wt. % of the fraction <C6.

In the case of a polypropylene homopolymer the process of the current invention is further characterized by a removal after one hour of at least 20 wt. %, preferably at least 30 wt. %, more preferably at least 40 wt. % and most preferably at least 54 wt. % of the fraction C6, further characterized by a removal after one hour of at least 20 wt. %, preferably at least 30 wt. %, more preferably at least 40 wt. % and most preferably at least 50 wt. % of the fraction C7-C8, further characterized by a removal after one hour of at least 20 wt. %, preferably at least 30 wt. %, more preferably at least 40 wt. % and most preferably at least 53 wt. % of the fraction C9-C11, further characterized by a removal after one hour of at least 20 wt. %, preferably at least 30 wt. %, more preferably at least 40 wt. % and most preferably at least 53 wt. % of the fraction C12-C14, further characterised by a removal after one hour of at least 10 wt. %, preferably at least 20 wt. %, more preferably at least 25 wt. % and most preferably 30 wt. % of the fraction ≥C15, further characterized by a removal after four hours of at least 40 wt. %, preferably at least 50 wt. %, more preferably at least 60 wt. %, even more preferably at least 70 wt. %, even more preferably at least 80 wt. % and most preferably at least 84 wt. % of the fraction C6, further characterized by a removal after four hours of at least 40 wt. %, preferably at least 55 wt. %, more preferably at least 70 wt. % and most preferably at least 84 wt. % of the fraction C7-C8, further characterized by a removal after four hours of at least 40 wt. %, preferably at least 50 wt. %, more preferably at least 60 wt. %, even more preferably at least 70 wt. % and most preferably at least 78 wt. % of the fraction C9-C11, further characterized by a removal after four hours of at least 40 wt. %, preferably at least 50 wt. %, more preferably at least 60 wt. % and most preferably at least 72 wt. % of the fraction C12-C14, further characterised by a removal after four hours of at least 20 wt. %, preferably at least 30 wt. %, more preferably at least 40 wt. % and most preferably at least 53 wt. % of the fraction ≥C15.

In the case of copolymers comprising ethylene, butene or larger olefins the process of the current invention is further characterized by a removal after one hour of at least 20 wt. %, preferably at least 30 wt. %, more preferably at least 40 wt. %, even more preferably at least 50 wt. %, even more preferably at least 60 wt. % and most preferably at least 65 wt. % of the fraction C8-C9, further characterised by a removal after one hour of at least 20 wt. %, preferably at least 30 wt. %, more preferably at least 40 wt. %, even more preferably at least 50 wt. % and most preferably at least 57 wt. % of the fraction C10-C11, further characterised by a removal after one hour of at least 20 wt. %, preferably at least 30 wt. %, more preferably at least 40 wt. % and most preferably at least 48 wt. % of the fraction C12-C13, further characterised by a removal after one hour of at least 10 wt. %, preferably at least 20 wt. %, more preferably at least 30 wt. % and most preferably at least 35 wt. % of the fraction C14-C15, further characterised by a removal after one hour of at least 5 wt. % preferably at least 10 wt. % of the fraction ≥C16, further characterized by a removal after four hours of at least 40 wt. %, preferably at least 50 wt. %, more preferably at least 60 wt. % and most preferably at least 72 wt. % of the fraction C8-C9, further characterised by a removal after four hours of at least 40 wt. %, preferably at least 50 wt. %, more preferably at least 60 wt. %, even more preferably at least 70 wt. % and most preferably at least 80 wt. % of the fraction C10-C11, further characterised by a removal after four hours of at least 40 wt. %, preferably at least 50 wt. %, more preferably at least 60 wt. %, even more preferably at least 70 wt. % and most preferably at least 81 wt. % of the fraction C12-C13, further characterised by a removal after four hours of at least 20 wt. %, preferably at least 30 wt. %, more preferably at least 40 wt. %, even more preferably at least 50 wt. % and most preferably at least 61 wt. % of the fraction C14-C15, further characterised by a removal after four hours of at least 10 wt. %, preferably at least 15 wt. %, more preferably at least 20 wt. %, even more preferably at least 25 wt. % and most preferably at least 29 wt. % of the fraction ≥C16.

It is well understood by the person skilled in the art that in case of copolymers comprising ethylene, butene or larger olefins the process of the current invention can also be applied to remove the fraction C6-C7.

In the case of pellets the extracting process according to the present invention is preferably combined with a blending process mixing pellets produced during the complete production time thus minimizing small quality variations.

The present invention is furthermore directed to the use of a liquid for removal of volatile components from plastic materials, preferably water, at $T_b-25°$ C. to $T_b$, preferably at $T_b-10°$ C. to $T_b$ of the liquid, wherein $T_b$ is the boiling point of the liquid at the applied pressure. These volatile components comprise monomers, hydrocarbons and hydrocarbon derivatives including substituted hydrocarbons, alcohols, ketones, aldehydes, carboxylic acids, amines, imines, epoxydes, ethers, and derivatives thereof. The inventive use allows removal of volatile components containing 2 to 20 carbon atoms, preferably 2 to 15 carbon atoms, more preferably 2 to 12 carbon atoms and most preferably 6 to 12 carbon atoms. The inventive use allows removal of volatile components essentially consisting of hydrocarbons having 2 to 20 carbon atoms preferably 2 to 15 carbon atoms, more preferably 2 to 12 carbon atoms and most preferably 6 to 12 carbon atoms. In this respect "essentially consist" means 50 to 100%, preferably 80 to 100% of the total removed volatile components. The inventive use particularly allows removal of components with a boiling point up to 360° C., more preferably from −104° C. to 280° C. and most preferably from 65° C. to 230° C.

In the inventive use, the liquid is selected from water, ethanol, propanol, isopropanol, butanol and mixtures thereof. Preferably the liquid is water.

The present invention furthermore concerns a plant for the removal of volatile components from plastic material comprising
(a) an extruder for extruding olefin polymers;
(b) a pelletiser adjacent to the extruder;
(c) a treatment tank or a group of treatment tanks (herein later referred to as treatment tank(s)) for degassing (=treatment) of the polymer;
   Preferably, the liquid quantity within the treatment tank(s) is kept at 5 to 200 vol. % and more preferably at 5 to 100 vol. % above the theoretical minimum to fill the volume between the pellets. This means that preferably sufficient liquid is present to disperse the pellets in the liquid within the treatment tank(s).
   Further, preferably the liquid within the treatment tank(s) is kept at $T_b$−25° C. to $T_b$, preferably at $T_b$−10° C. to $T_b$ of the liquid, wherein $T_b$ is the boiling point of the liquid at the applied pressure.
(d) optionally a stirrer having at least one mixing element within the treatment tank(s);
   Preferably, this stirrer causes a plug flow pattern within the treatment tank(s).
(e) a liquid tank or a group of liquid tanks;
(f) a conduit or a group of conduits for transporting the pellet slurry, obtained from the pelletiser to the treatment tank(s);
   In a preferred embodiment the conduit or group of conduits is connected to an inlet next to the top of the treatment tank(s). Further, in another preferred embodiment the conduit or group of conduits is connected to an inlet next to the bottom of the treatment tank(s).
(g) a conduit or a group of conduits for connecting the liquid tank or the group of liquid tanks with the pelletiser;
(h) pumping means for establishing a liquid flow along the conduit or the group of conduits mentioned under (g) above;
(i) a conduit or a group of conduits for connecting the liquid tank or the group of liquid tanks with the treatment tank(s);
   In a preferred embodiment the conduit or the group of conduits is connected to an inlet next to the bottom of the treatment tank or each of the group of treatment tanks. Further, in another preferred embodiment the conduit or group of conduits is connected to an inlet next to the top of the treatment tank(s).
(k) pumping means for establishing a liquid flow along the conduit or the group of conduits mentioned under (i) above,
(l) a conduit or a group of conduits for the withdrawal of the pellet slurry from the treatment tank or from each of the treatment tanks and
   In a preferred embodiment the conduit or the group of conduits is connected to an inlet next to the bottom of the at least one treatment tank. Further, in another preferred embodiment the conduit or group of conduits is connected to an inlet next to the top of the treatment tank(s).
   Further preferably the conduit or the group of conduits comprises hydraulic conveying means
(m) a conduit or a group of conduits for feeding liquid from a liquid source into the liquid tank or the group of liquid tanks.

The plant preferably comprises a liquid separator or a group of liquid separators adjacent to one or more of the conduits transporting the pellet slurry. The liquid separators may be adjacent to the conduit or the group of conduits transporting the pellet slurry from the pelletiser to the treatment tank(s) and/or adjacent to the conduit or the group of conduits withdrawing the pellet slurry from the treatment tank(s).

In each liquid separator some, preferably 40% to 98% and more preferably 70% to 95% of the liquid is separated from the pellets. Preferably the liquid separated from the pellet slurry is routed to the liquid tank or the group of liquid tanks.

Further, preferably the plant comprises cooling means for cooling the liquid prior to its entry into the pelletiser. Any cooling means known to the person skilled in the art may be used. Preferably heat exchangers are used. Particular preferred are heat exchangers using cooling water.

The plant preferably comprises means for purging the treatment tank or the group of treatment tanks (herein later referred to as treatment tank(s)) with inert gas or air. More preferably the means for purging the treatment tank(s) are means for purging by inert gas.

The plant according to the present invention furthermore preferably comprises means for heating the treatment tank(s). The heating may be accomplished by means for heating the pellets in the liquid solution as obtained from the die on the way to the treatment tank(s) (wherein the volatile components are removed) and/or may be used for heating the treatment tank(s) itself/themselves and/or heating may be achieved by any other means known to the person skilled in the art. Preferably the heating is achieved by injecting vaporised liquid into the liquid or by heating coils.

More preferably, a vaporised liquid is injected into the treatment tank(s), most preferably, the means for heating are means for injection of steam into the treatment tank(s).

The plant according to the present invention preferably comprises hydraulic conveying means for transporting the pellet slurry, whereby additional drying steps can be avoided and the safety of the plant is enhanced.

The plant according to the present invention preferably comprises at least one off-gas condenser for minimizing hydrocarbon emissions into the atmosphere and to recover main part of the liquid before the vented organic volatiles are routed to downstream processes (like recovery, fuel gas system, etc.). If present the at least one off-gas condenser is connected to the at least one liquid tank and/or the at least one treatment tank and/or to the conduits or group of conduits through vents. The valves and conduits required for that purpose are known to the person skilled in the art. Therefore, they are not shown in FIGS. 1 to 5 as described below for clarity reasons.

The plant according to the present invention further preferably comprises at least one blending tank optionally equipped with a stirrer. The at least one blending tank has an inlet for the pellet slurry. In a preferred embodiment the inlet is located at the top of the blending tank and the outlet for the pellet slurry is located at the bottom of the blending tank. In another preferred embodiment the inlet for the pellet slurry is located at the bottom of the blending tank and the outlet for the pellet slurry is located at the top of the blending tank. In yet another preferred embodiment the inlet for the pellet slurry and the outlet for the pellet slurry are both located at the bottom of the blending tank. In yet another preferred embodiment the inlet for the pellet slurry and the outlet for the pellet slurry are both located at the top of the blending tank. Within the blending tank the flow disturbances are smoothed and the pellets are blended, furthermore the hot pellets are cooled, preferably a stirrer is used to smoothen the flow disturbances and blending and cooling the pellets.

The presence of volatile components further requires closed liquid tanks, instead of atmospheric liquid tanks commonly used today. This is in line with directive 1999/13/EC of the European Union on the limitation of emissions of volatile organic compounds due to the use of organic solvents in certain activities and installations.

Therefore, the at least one liquid tank of the plant according to the invention as described above and of the plants P1 to P5 as exemplified below is a closed liquid tank. Furthermore the at least one liquid tank is equipped in an embodiment of the invention with skimmer facilities, to remove any traces of heavier hydrocarbons/oil and eventual polymer dust from the liquid systems.

Preferably, any means for further liquid treatment (e.g. purification steps, waste water treatment) may be comprised in the plant. The at least one liquid tank and/or treatment tank may be equipped with such means and/or the means are in connection with any of the conduits of the plant, preferably with the conduits not transporting the pellet slurry.

DETAILED DESCRIPTION

FIGS. 1. to 5. show non-limiting examples for plants according to the present invention. The plants shown in FIGS. 1 to 5 may additionally comprise
- means for purging the treatment tank with inert gas or air, preferably inert gas into the treatment tank,
- means for heating the treatment tank,
- cooling means for cooling the liquid prior to its entry into the pelletiser,
- hydraulic conveying means,
- one or more off-gas condensers
- a blending tank
- means for liquid treatment each as described above.

FIG. 1 shows an example for an plant according to the present invention, herein later referred as P1.

The plant comprises
(a) an extruder (101) for extruding olefin polymers;
(b) a pelletiser (102) adjacent to extruder (101);
(c) a treatment tank (103) for degassing of the polymer;
  Preferably, the liquid quantity within treatment tank (103) is kept at 5 to 200 vol. % and more preferably at 5 to 100 vol. % above the theoretical minimum to fill the volume between the pellets. This means that preferably sufficient liquid is present to disperse the pellets in the liquid within treatment tank (103).
  Further, preferably the liquid within treatment tank (103) is kept at $T_b-25°$ C. to $T_b$, more preferably at $T_b-10°$ C. to $T_b$ of the liquid, wherein $T_b$ is the boiling point of the liquid at the applied pressure.
(d) optionally a stirrer (104) having a mixing element within the treatment tank (103);
  Preferably, this stirrer causes a plug flow pattern within the treatment tank.
(e) a liquid tank (105);
(f) a conduit (106) for transporting the pellet slurry obtained from pelletiser (102) to treatment tank (103); In a preferred embodiment conduit (106) is connected to an inlet next to the top of treatment tank (103). Further, in another preferred embodiment conduit (106) is connected to an inlet next to the bottom of treatment tank (103);
(g) a conduit (107) connecting liquid tank (105) with pelletiser (102);
(h) pumping means (108) for establishing a liquid flow along conduit (107);
(i) a conduit (109) connecting liquid tank (105) with treatment tank (103). In a preferred embodiment the conduit (109) is connected to an inlet next to the bottom of treatment tank (103). Further, in another preferred embodiment the conduit (109) is connected to an inlet next to the top of treatment tank (103);
(k) pumping means (110) for establishing a liquid flow along conduit (109),
(l) a conduit (111) for the withdrawal of the pellet slurry from treatment tank (103);
  In a preferred embodiment the conduit (111) is connected to an inlet next to the bottom of treatment tank (103). In another preferred embodiment the conduit (111) is connected to an inlet next to the top of treatment tank (103); further preferably conduit (111) comprises hydraulic conveying means; and
(m) a conduit (112) for feeding liquid from a liquid source into the at least one liquid tank (105).

The plant P1 is the minimum requirement to carry out the invention. Few components are required resulting in a minimum of space needed, thus, the plant P1 is for example suitable for smaller installations where space is rare. Hence, existing plants can easily be equipped with and/or upgraded to the plant P1. Furthermore, the plant is maintenance-friendly due to the low amount of components.

Moreover, the plant P1 can be further equipped with means for purging the treatment tank with inert gas or air, means for heating the treatment tank, cooling means for cooling the liquid prior to its entry into the pelletiser, hydraulic conveying means, one or more off-gas condensers and/or a blending tank as described above. This further allows that plant P1 can be easily integrated in an existing plant or an assembly of several plants.

Figure 2:
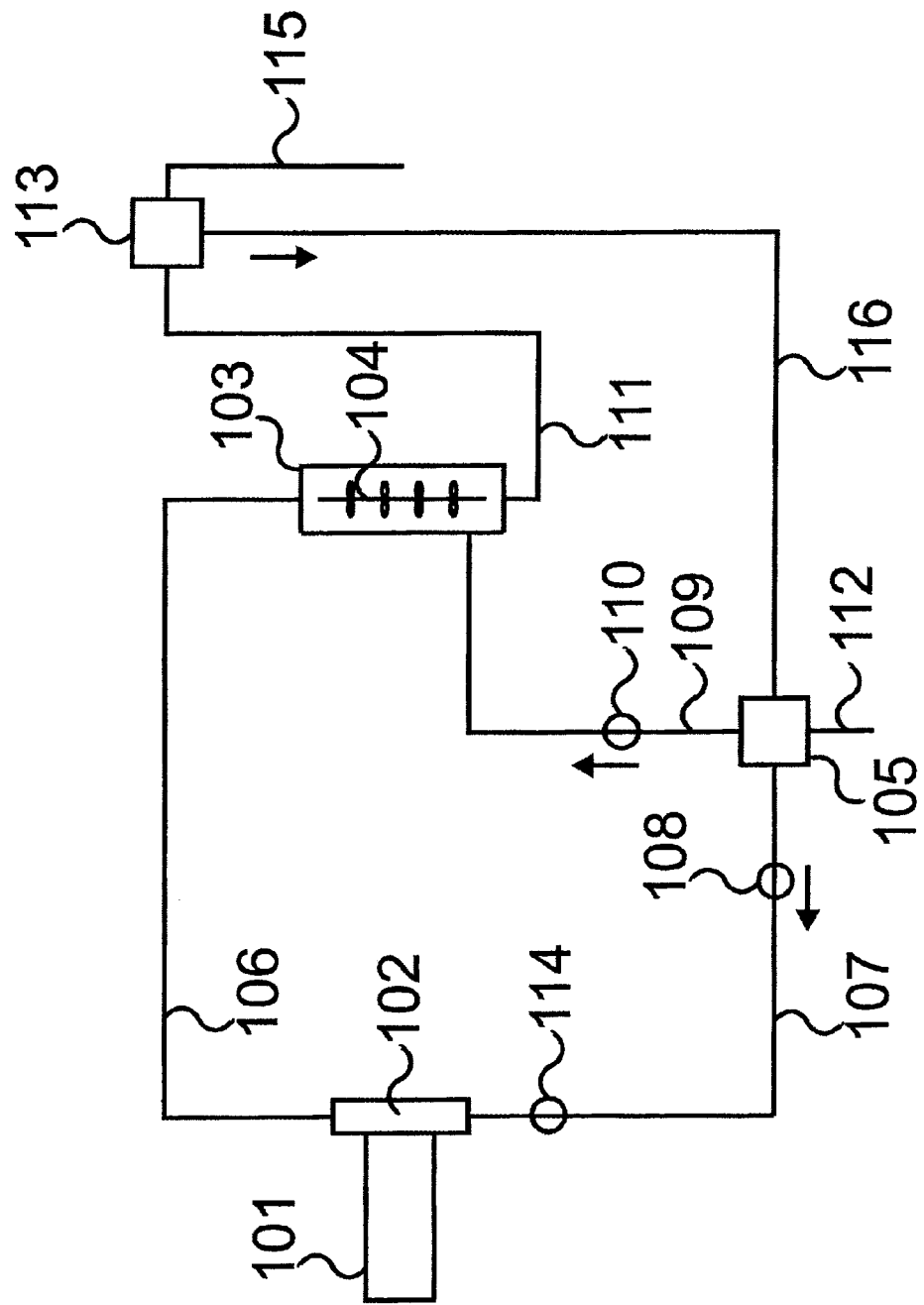

FIG. 2 shows another example of an plant according to the present invention, herein later referred as P2.

The plant comprises all components of the plant P1 shown in FIG. 1 and further comprises
(n) a liquid separator (113) connected to the treatment tank (103) via conduit (111) wherein some, preferably 40% to 98% and more preferably 70% to 95% of the degassing liquid is removed and fed via conduit (116) into the liquid tank (105).
(o) optional cooling means (114) along conduit (107) for cooling the liquid coming from the liquid tank (105) prior to its entry into pelletiser (102); Any cooling means known to the person skilled in the art may be used. Preferably heat exchangers are used. Particular preferred are heat exchangers using cooling water.
(p) a conduit (115) for the withdrawal of the pellet slurry obtained from liquid separator (113), preferably conduit (115) comprises hydraulic conveying means.

The plant P2 recycles the liquid used in the pelletiser and the treatment tank, thus saving liquid. Although it is of course possible to integrate the plant P2 in an existing plant or an assembly of several plants as P1, P2 can operate more independently than the plant P1 due to the circulation of the liquid. Hence, P2 may also be operated completely independent from other plants. Further, the amount of liquid removed in the liquid separator can be adjusted depending on the further treatment steps of the pellets (not shown), e.g. drying or treatment in a blending tank as described above.

Figure 3:
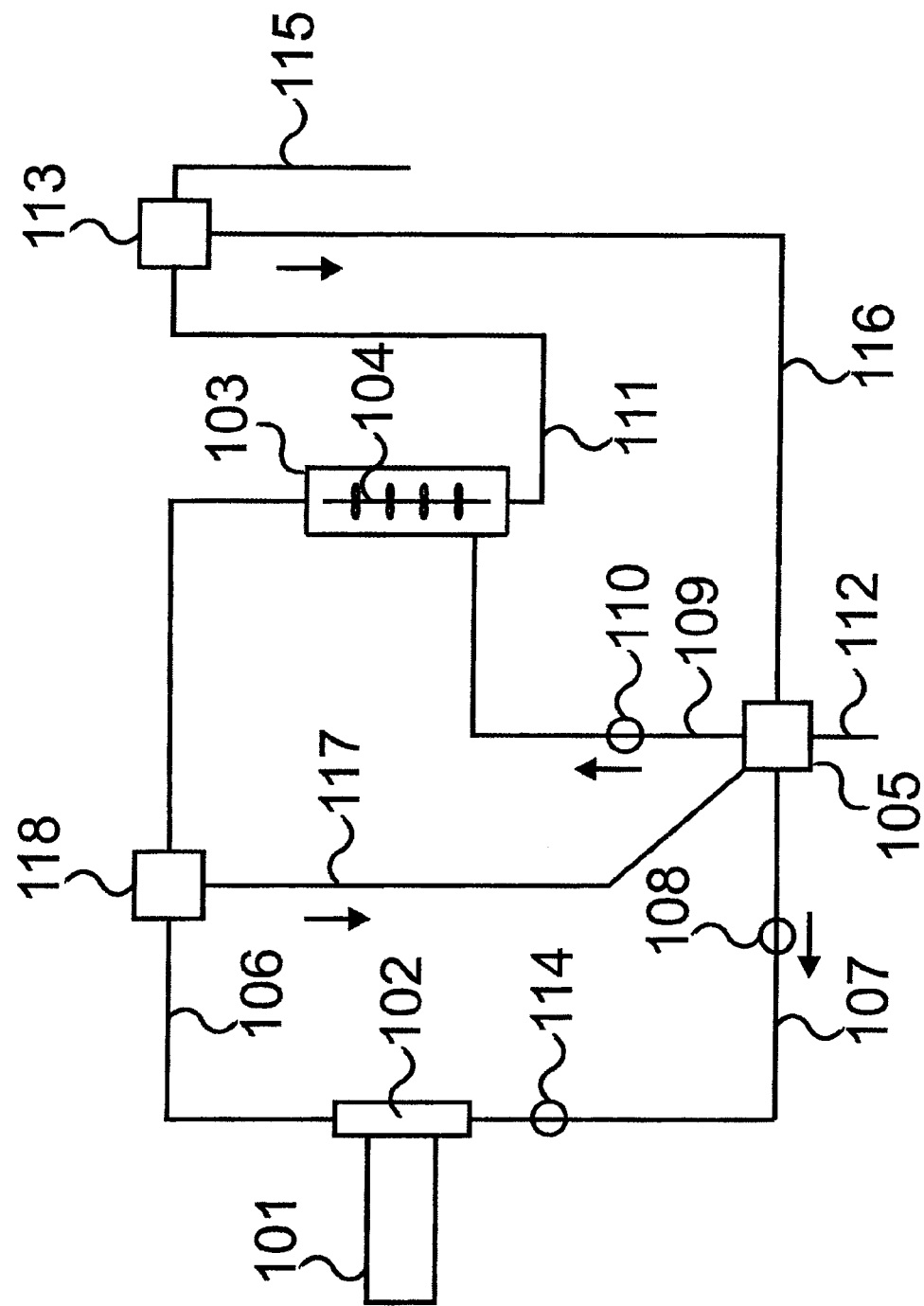

FIG. 3 shows another example for an plant according to the present invention, herein later referred as P3.

The plant comprises all components of the plant P2 shown in FIG. 2 and further comprises (q) a liquid separator (118) adjacent to conduit (106) connected via conduit (117) to liquid tank (105). Preferably, in liquid separator (118) some, more preferably 40% to 98% and most preferably 70% to 95% of the pelletising liquid is separated from the pellet slurry prior to its entry into treatment tank (103) and fed via conduit (117) into the liquid tank (105).

P3 is commensurate with P2 in that the liquid is recycled, thus saving liquid. Further, the plant according to P3 is preferred if the extruder and the pelletiser are working at a temperature such that large amounts of liquid are needed for cooling within the pelletiser. In such a case the pellet slurry obtained from the pelletiser has a low concentration which requires a significantly larger treatment tank to treat the same amount of pellets in the same time. Thus, by concentrating the pellet slurry in liquid separator (118), a smaller treatment tank can be used. This reduces the costs.

Figure 4:
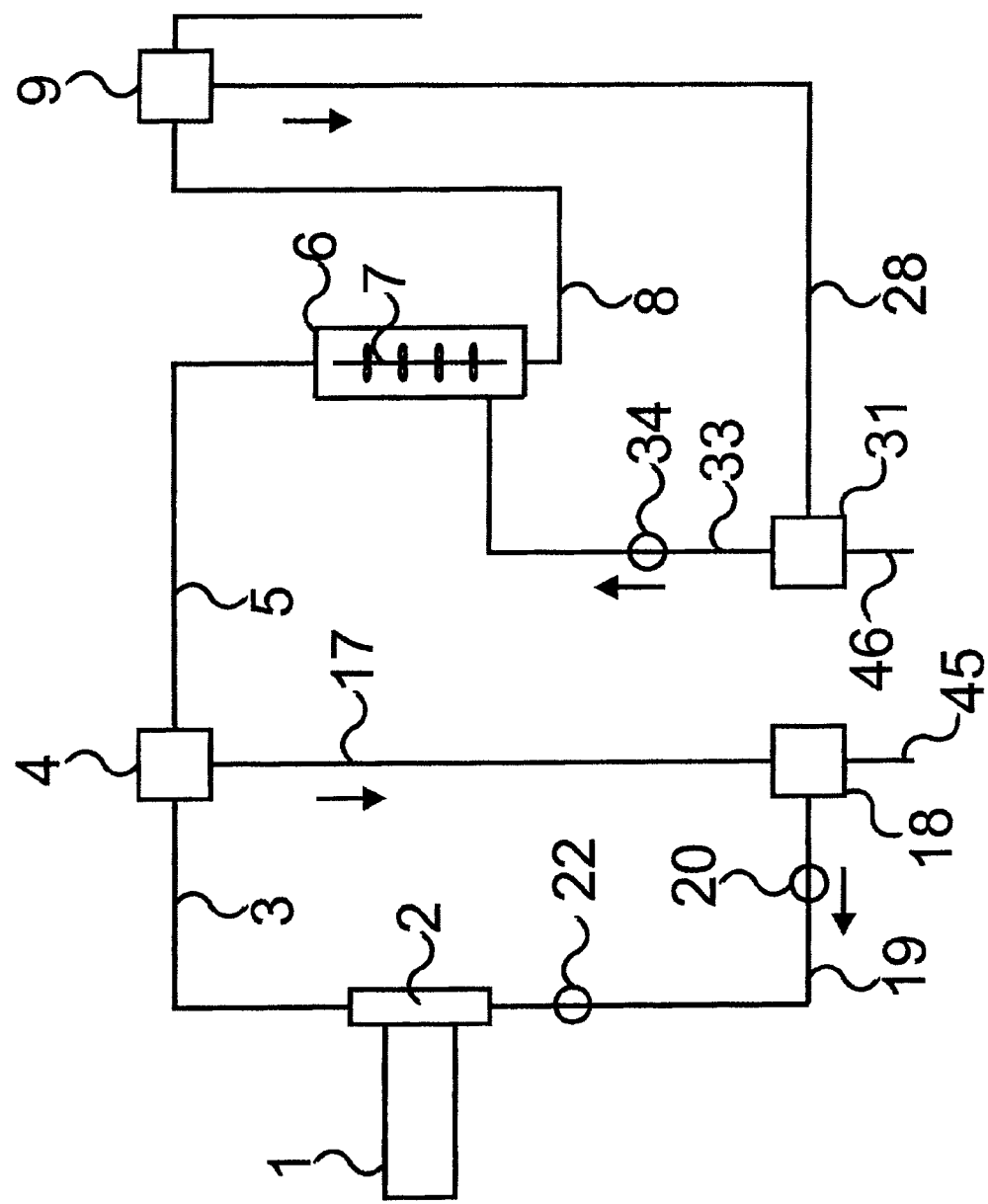

FIG. 4 shows another example for an plant according to the present invention, herein later referred as P4 which comprises (a) an extruder (1) for extruding olefin polymers;
(b) a pelletiser (2) adjacent to extruder (1);
(c) a liquid separator (4) wherein preferably some, more preferably 40% to 98% and most preferably 70% to 95% of the pelletising liquid is separated and withdrawn via conduit (17) from liquid separator (4);
(d) a conduit (3) for transporting the pellets obtained from the pelletiser (2) to liquid separator (4);
(e) a treatment tank (6) for degassing of the pellets. The pellet slurry obtained from liquid separator (4) is fed through conduit (5) to an inlet of treatment tank (6). In a preferred embodiment this inlet is located next to the top of treatment tank (6). Further, in another preferred embodiment this inlet is located next to the bottom of treatment tank (6).

Preferably, the liquid quantity within treatment tank (6) is kept at 5 to 200 vol. % and more preferably at 5 to 100 vol. % above the theoretical minimum to fill the volume between the pellets. This means that preferably sufficient liquid is present to disperse the pellets in the liquid within treatment tank (6).

Further, preferably the liquid within treatment tank (6) is kept at $T_b$–25° C. to $T_b$, preferably at $T_b$–10° C. to $T_b$ of the liquid, wherein $T_b$ is the boiling point of the liquid at the applied pressure.

(f) optionally a stirrer (7) having at least one mixing element within the treatment tank (6);

Preferably, this stirrer causes a plug flow pattern within the treatment tank.

(g) a liquid tank (18) connected to the pelletiser (2) via conduit (19) and to liquid separator (4) via conduit (17);
(h) pumping means (20);
(i) optional cooling means (22) for cooling the liquid prior to its entry into pelletiser (2);

Preferably the cooling means are located adjacent to conduit (19) for cooling the liquid coming from the liquid tank (18) prior to its entry into pelletiser (2); Any cooling means known to the person skilled in the art may be used. Preferably heat exchangers are used. Particular preferred are heat exchangers using cooling liquid.

(k) a conduit (8) for the removal of the pellet slurry from treatment tank (6);

In a preferred embodiment the conduit (8) is connected to an inlet next to the bottom of treatment tank (6). In another preferred embodiment the conduit (8) is connected to an inlet next to the top of treatment tank (6); further preferably conduit (8) comprises hydraulic conveying means; and (l) a liquid separator (9) connected via conduit (8) to treatment tank (6) wherein preferably some, more preferably 40% to 98% and most preferably 70% to 95% of the pelletising liquid is separated and withdrawn via conduit (28) from liquid separator (9);

(m) a liquid tank (31) receiving the separated liquid from liquid separator (9) through conduit (28);

(n) a conduit (33) connecting liquid tank (31) to an inlet of treatment tank (6);

In a preferred embodiment this inlet is located next to the bottom of treatment tank (6). Further, in another preferred embodiment this inlet is located next to the top of treatment tank (6).

(o) pumping means (34);
(p) optional a conduit (45) for feeding liquid from a liquid source into liquid tank (18); and
(q) optional a conduit (46) for feeding liquid from a liquid source into liquid tank (31);

The plant P4 also has two liquid separators and hence the advantages as described for plant P3. Furthermore, plant P4 comprises two liquid tanks (18) and (31) being part of two nearly independent liquid cycles.

Preferably some, more preferably 40% to 98% and most preferably 70% to 95% of the pelletising liquid obtained from pelletiser (2) is separated from the pellets in liquid separator (4), optionally cooled and reintroduced into pelletiser (2) (first cycle).

Further, preferably some, more preferably 40% to 98% and most preferably 70% to 95% of the liquid used for the treatment of the pellets in treatment tank (6) is separated from the pellets in liquid separator (9) and reintroduced in treatment tank (6) as described above (second cycle).

These two cycles allow that additional liquids may be added in the second cycle (i.e. for the treatment of the pellets) by any means known in the art. The obtained liquid mixture does not enter the first cycle. This is preferred in cases the liquid used for treating the pellets in the treatment tank is not suitable for being used in the pelletiser.

Thus, for example water may be used in the first cycle and a mixture of water (with e.g. alcohols as described above) in the second cycle.

Further, also in case water is used in both cycles P4 is also advantageous.

In such a case, the pelletising water obtained from pelletiser (2) usually has a temperature of about 40 to 60° C. whereas the degassing water usually has a temperature of 75 to 100° C. at normal pressure. The water streams obtained from water separators (4) and (9) are not mixed. The separated pelletising water obtained from water separator (4) through conduit (17) is collected in liquid tank (18) cooled, if necessary, and reintroduced in pelletiser (2). Because it is not mixed with the warmer degassing water less or even no cooling is necessary. Further, the degassing water obtained from water separator (9) through line (28) is collected in liquid tank (31) reintroduced into treatment tank (6), heated, if necessary, by the means as described above. Due to the higher temperature of the degassing water less heating is necessary. Thus, energy and cooling water consumption is reduced. This reduces the costs.

Figure 5:
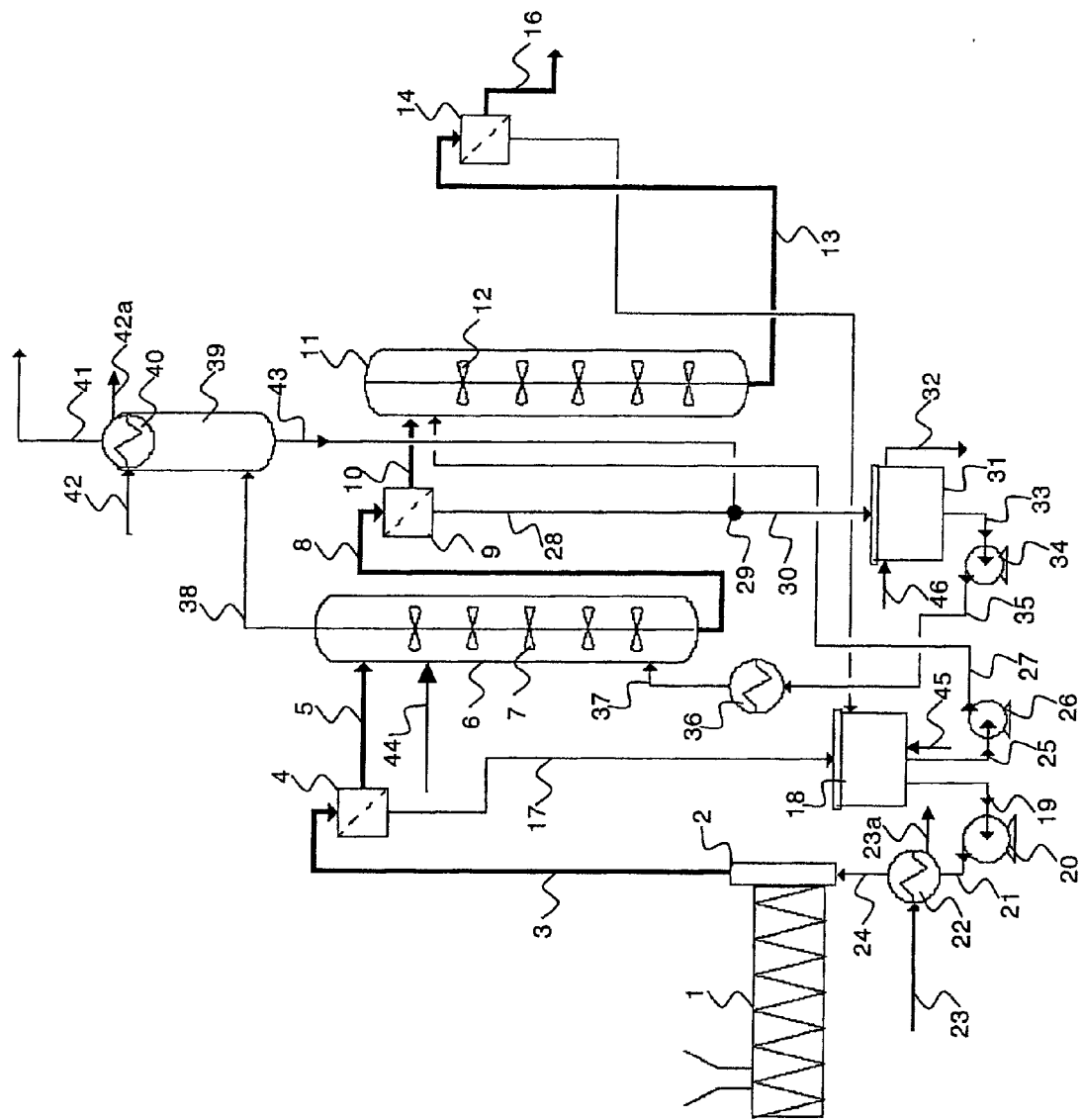

FIG. 5 shows a further example for a plant according to the present invention.

The plastic material from extruder 1 is pelletised in pelletiser 2 and transported by water via conduit 3 to water separator 4 wherein some, preferably 40% to 98% and more preferably 70% to 95% of the pelletising water is removed. The pellets together with the warm pelletising water are then fed via conduit 5 through an inlet into treatment tank 6. In a preferred embodiment this inlet is located next to the top of treatment tank 6. In another preferred embodiment this inlet is located next to the bottom of treatment tank 6. The water quantity is kept at 5 to 200 vol. %, preferably at 5 to 100 vol. % above the theoretical minimum to fill the volume between the pellets. This means that sufficient water is present to disperse the pellets in the water within treatment tank 6. Further, the liquid within treatment tank 6 is kept at $T_b$–25° C. to $T_b$, preferably at $T_b$–10° C. to $T_b$ of the liquid, wherein $T_b$ is the boiling point of the liquid at the applied pressure.

The flow pattern in treatment tank 6 is comparable to a series of continuous Stirred Tank Reactors (CSTRs). This makes residence time distribution in the treatment tank 6 close to plug flow down through the treatment tank 6. Since the treatment is inter alia dependent on residence time, this narrow residence distribution ensures even treatment of each polymer pellet. Preferably treatment tank 6 is equipped with a stirrer 7 to make the residence time distribution in the treatment tank 6 close to plug flow down through the treatment tank 6.

Steam is added via line 37 at an inlet, which is preferably located at the bottom of the treatment tank 6. Of course, for any possible technical reason the inlet may also be located at the top of the treatment tank. Part of the steam is condensed, which maintains the temperature in the treatment tank 6. The remaining part is bubbled through the slurry, to support removal of light volatile components.

The pellet slurry leaving the treatment tank 6 is routed via conduit 8 to water separator 9 wherein some, preferably 40% to 98% and more preferably 70% to 95% of the degassing water is separated. The pellets are fed via conduit 10 into blending tank 11 via an inlet. In a preferred embodiment this inlet is located at the top of blending tank 11. In another preferred embodiment this inlet is located at the bottom of blending tank 11. In the blending tank 11 the flow disturbances are smoothed and the pellets are blended, furthermore the hot pellets are cooled, preferably a stirrer 12 is used to smoothen the flow disturbances, blend and cool the pellets.

The pellets are withdrawn at the bottom of blending tank 11 via conduit 13 and transported to water separator 14. This can be carried out by hydraulic conveying means (not shown).

In water separator 14 most of the blending water is separated and the pellets are transported via conduit 16 to spin drier and classifier (not shown).

The pelletising water separated from the pellets in water separator 4 is fed via conduit 17 to closed pellet water tank 18. Tank 18 is equipped with skimmer facilities, to remove any traces of heavier hydrocarbons/oil and eventual polymer dust from the water.

The first part of the water from liquid tank 18 is fed via conduit 19 to pellet water pump 20 and subsequently pumped via conduit 21 to pellet water cooler 22.

Cooling water is fed via conduit 23 to pellet water cooler 22 and removed through conduit 23a for cooling and the cooled pellet water is then introduced via conduit 24 into pelletiser 2.

The second part of the water from liquid tank 18 is fed via conduit 25 into blending water pump 26 and pumped via conduit 27 into blending tank 11.

The hot water separated from the pellets in water separator 9 is removed via conduit 28 and combined at intersection 29 with conduit 43 transporting the water condensed in off-gas condenser 40. Via conduit 30 the combined water stream is fed into liquid tank 31 (degassing water tank). Tank 31 is equipped with skimmer facilities, to remove any traces of heavier hydrocarbons/oil and eventual polymer dust from the water. A first part of the water is withdrawn from liquid tank 31 via conduit 32 for subsequent waste water treatment.

A second part is fed via conduit 33 to degassing water pump 34 and subsequently pumped via conduit 35 to degassing water heater 36. Therein the water is vaporised and fed via conduit 37 into treatment tank 6.

The vapours from the treatment tank 6 are vented via conduit 38 to off-gas knock out drum 39 equipped with off-gas condenser 40, to recover main part of the water before the vented light hydrocarbons are routed via conduit 41 to downstream processes (like recovery, fuel gas system, etc.). Cooling water is supplied through conduit 42 and removed through conduit 42a. The recovered water is fed via conduit 43 to intersection 29 where it is combined with the hot degassing water from conduit 28.

The plant may comprise a conduit 44 for applying an air stream or an inert gas stream into the treatment tank.

The plant may further comprise a conduit (45) for feeding liquid from a liquid source into liquid tank (18) and may further comprise a conduit (46) for feeding liquid from a liquid source into liquid tank (31);

The water separators 4 and 9 in front of the degassing (=treatment) tank and the blending tank respectively are merely optional. The separate circulation of water nevertheless reduces the need for reheating and cooling of the water. This reduces the steam consumption of the system by more than 50%, whereby the cooling water consumption is substantially reduced, resulting in a significant reduction in energy consumption.

The pellet water system and hot water system can contain traces of light hydrocarbons and the vents from these systems are routed to the condenser as well. The valves and conduits for that purpose are known to the person skilled in the art, therefore, they are not shown in FIG. 5 for clarity reasons.

The presence of volatile components further requires closed pellet water 18 and hot water tanks 31, instead of atmospheric pellet water tanks commonly used today. This is in line with directive 1999/13/EC of the European Union on the limitation of emissions of volatile organic compounds due to the use of organic solvents in certain activities and installations.

Liquid tanks 18 and 31 are also equipped with skimmer facilities, to remove any traces of heavier hydrocarbons/oil and eventual polymer dust from the water systems.

Preferably, any means for further liquid treatment (e.g. purification steps, waste water treatment) may be comprised in the plant. The at least one liquid tank and/or treatment tank may be equipped with such means and/or the means are in connection with any of the conduits of the plant, preferably with the conduits not transporting the pellet slurry.

The plant P5 has all the advantages of P4. It further demonstrates how blending tank and off-gas-condenser can be integrated in the plant.

Experimental
Definition of Measurement Methods:
Melt Flow Rate:
$MFR_2$: ISO 1133 (230° C., 2.16 kg load) for propylene homo- and copolymers.
$MFR_5$: ISO 1133 (190° C., 5 kg load) for ethylene homo- and copolymers.
$MFR_{21}$: ISO 1133 (190° C., 21.6 kg load) for ethylene homo- and copolymers
μg/g
If not otherwise mentioned this means μg volatile compounds per gram of sample.
Determination of Total Emission
The total emission of the polymers was determined by using multiple head space extraction according to method (A) as described below. If not mentioned otherwise all reported data refer to method (A).

The method (A) for measuring volatile components is carried out as follows:

The volatile components as described above were determined by using a gas chromatograph and a headspace method. The equipment was a Hewlett Packard gas chromatograph with a 25 m×0.32 mm×2.5 μm (length×diameter×size of packing material) non-polar column filled with DB-1 (100% dimethyl polysiloxane). A flame ionisation detector was used with hydrogen as a fuel gas. Helium at 10 psi was used as a carrier gas with a flow rate of 3 ml/min. After the injection of the sample the oven temperature was maintained at 50° C. for 3 minutes, after which it was increased at a rate of 12° C./min until it reached 200° C. Then the oven was maintained at that temperature for 4 minutes, after which the analysis was completed.

The calibration was carried out as follows: At least three and preferably from five to ten reference solutions were prepared, containing from 0.1 to 100 g of n-octane dissolved in 1 litre of dodecane. The concentration of octane in the reference solutions should be in the same area as the range of the volatiles in the samples to be analysed. 4 μl of each solution was injected into a 20 ml injection flask, which was thermostated to 120° C. and analysed. A calibration factor Rf for the area under the n-octane peak, A, vs. the amount of n-octane in the solution in μg, C, was thus obtained as Rf=C/A.

The analysis was conducted as follows: The polymer sample (about 2 grams) was placed in the 20 ml injection flask, which was thermostated to 120° C. and kept at that temperature for one hour. A gas sample from the injection flask was then injected into the GC. Before the analysis, a blind run was conducted, where an injection from an empty flask was made. The hydrocarbon emission E was then calculated as follows:

$$E = AT \cdot Rf/W \cdot 1000000$$

wherein
E is the hydrocarbon emission as μg volatile compounds per gram of sample,
AT is the total area under the sample peaks in area counts,
Rf is the calibration factor for n-octane in μg per area count, and
W is the weight of the sample in grams.

REFERENCE EXAMPLE 1 a) Catalyst Preparation

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried.

b) Prepolymerisation

Into a continuous stirred tank vessel having a volume of 15 $dm^3$ were fed 35 kg/h of liquid propylene and 1.2 g/h of hydrogen. In addition, 0.61 g/h of the solid polymerization catalyst prepared according to a) above was added.

Together with the above-mentioned solid component, a cocatalyst containing triethylaluminium as an activator and dicyclopentyldimethoxysilane as an electron donor was used so that the molar ratio of the activator to titanium was 450 and the molar ratio of the activator to the electron donor was 10. The temperature in the tank was 30° C. and the pressure was 55 bar.

c) Slurry Polymerization

The slurry withdrawn from the prepolymerisation step above was directed into a slurry polymerization step conducted in a loop reactor having a volume of 150 $dm^3$ at a temperature of 70° C. and a pressure of 54 bar. In addition, 158 kg/h of propylene and 10 g/h of hydrogen were introduced into the reactor. The production rate of the propylene homopolymer was 27 kg/h.

The $MFR_2$ of the propylene homopolymer thus obtained was 0.8 g/10 min.

d) Extrusion

The polymer was mixed with calcium stearate as acid scavenger and Irganox 1010 as antioxidant and 2,5-dimethyl-2,5-(ditenbutylperoxy)hexane in an amount from 0.5 to 1 g per one kg of polymer and the amount was adjusted so that the resulting polymer had an $MFR_2$ of 19 g/10 min. The polymer was then extruded to pellets in a ZSK30 twin screw extruder at 220° C. to 250° C. The pellets had a total emission of 129 μg/g.

EXAMPLE 2

The polymer produced in Reference Example 1 was treated as follows:

An amount of 60 g of the polymer and 100 ml of tap water were mixed in a 500 ml glass flask. The flask was thermostated to 100° C. for 30 minutes and the water was allowed to boil. After the treatment the polymer was recovered and dried in an oven at 70° C. for 60 minutes. The total emission remaining was found to be 68 μg/g. The data is shown in Table 1.

EXAMPLE 3

The procedure of Example 2 was repeated, except that the gas head of the flask was purged with nitrogen at a rate of about 0.02 $Nm^3$/h during the treatment. The total emission remaining was found to be 59 μg/g. The data is shown in Table 1.

EXAMPLE 4

The procedure of Example 2 was repeated, except that the flask was thermostated to 80° C. so that the water did not boil and the mixture was agitated by using a stirrer. The total emission remaining was found to be 97 μg/g. The data is shown in Table 1.

COMPARATIVE EXAMPLE 5

The procedure of Comparative Example 4 was repeated, except that the pellets were dried at 60° C. The total emission remaining was found to be 114 μg/g. The data is shown in Table 1.

TABLE 1

| | Emission data: | | | | | |
|---|---|---|---|---|---|---|
| Example | Total μg/g | <C6 μg/g | C6-C8 μg/g | C9-C11 μg/g | C12-C14 μg/g | ≥C15 μg/g |
| Reference Example 1 | 129 | 81 | 13 | 28 | 5 | 2 |
| Example 2[1] | 68 | 37 | 7 | 18 | 4 | 2 |
| Example 3[1] | 59 | 32 | 6 | 16 | 3 | 2 |
| Example 4[1] | 97 | 56 | 10 | 24 | 5 | 2 |
| Comparative Example 5[1] | 114 | 68 | 12 | 27 | 5 | 2 |

[1] emission remaining measured after treatment

EXAMPLE 6

The procedure of Reference Example 1 was repeated and the pellets were recovered. The total volatile content of the untreated polymer was 216.4 μg/g. The experiments were carried out in a 2 L glass beaker heated using a heating coil. To keep the level of water constant during the experiments, the vapour was condensed back to the beaker. These experiments were carried out for 6 h and samples were taken every hour. In order to have a direct comparison between the boiling time and the efficiency, the water was heated up to 100° C. before the pellets were introduced. Further, the pellets were dried with paper after they were boiled (and not in an oven) in order not to continue the degassing.

The weight ratio of water to pellets was 10:1. The data is shown in Table 2 below:

TABLE 2

| | | | water/pellet 10 | | | |
|---|---|---|---|---|---|---|
| Time (h) | <C6 μg/g | C6 μg/g | C7-C8 μg/g | C9-C11 μg/g | C12-C14 μg/g | ≥C15 μg/g | Tot μg/g |
| 0 | 153.6 | 14.9 | 23.9 | 11.2 | 8.7 | 2.5 | 216.4 |
| 1[1] | 79.9 | 6.5 | 10.2 | 5.2 | 4 | 1.6 | 108.8 |
| 2[1] | 52.5 | 4.4 | 7.5 | 3.9 | 3.7 | 1.2 | 75.3 |
| 3[1] | 34.8 | 3.4 | 5.7 | 3.6 | 3.1 | 0.9 | 52.9 |
| 4[1] | 22.3 | 2.3 | 3.6 | 2.3 | 2.4 | 0.8 | 35.4 |
| 5[1] | 17.9 | 2 | 4 | 2.5 | 2.4 | 0.8 | 35.1 |
| 6[1] | 11.8 | 1.6 | 3 | 1.9 | 1.8 | 0.7 | 22.6 |

[1] emission remaining measured after treatment

EXAMPLE 7

The procedure of Reference Example 1 was repeated except that the polymer was produced by amended slurry conditions such that a melt index $MFR_2$ of 11 for the final product was obtained and no treating with peroxide was made. The total volatile content of the untreated polymer was 62.5 μg/g. The treatment with boiling water was then made as described in Example 6 for 5 h with the weight ratio of water to pellets of 10. The data is shown in Table 3 below:

TABLE 3

| | | | water/pellet 10 | | | |
|---|---|---|---|---|---|---|
| Time (h) | <C6 μg/g | C6 μg/g | C7-C8 μg/g | C9-C11 μg/g | C12-C14 μg/g | ≥C15 μg/g | Tot μg/g |
| 0 | 28.5 | 6.8 | 7.4 | 11.4 | 6.3 | 1.5 | 62.5 |
| 1[1] | 9.5 | 2.3 | 2.6 | 4.3 | 2.6 | 0.8 | 22.3 |
| 2[1] | 5.4 | 1.3 | 1.9 | 3.0 | 1.9 | 0.6 | 14.6 |
| 3[1] | 4.4 | 0.9 | 1.9 | 2.6 | 1.7 | 0.5 | 12.5 |
| 4[1] | 2.7 | 0.6 | 1 | 1.8 | 1.4 | <0.5 | 8 |
| 5[1] | 1.9 | 0.4 | 0.8 | 1.4 | 1 | <0.5 | 6 |

[1] emission remaining measured after treatment

EXAMPLE 8

The procedure of Example 7 was repeated except that the ratio of water to pellets was 20. The data is shown in Table 4 below:

TABLE 4

| | | | Water/Pellet 20 | | | |
|---|---|---|---|---|---|---|
| Time (h) | <C6 μg/g | C6 μg/g | C7-C8 μg/g | C9-C11 μg/g | C12-C14 μg/g | ≥C15 μg/g | Tot μg/g |
| 0 | 22.8 | 5.7 | 6.3 | 6.9 | 6 | 1.3 | 49 |
| 0.25[1] | 11.4 | 2.8 | 3 | 4.9 | 2.9 | 0.7 | 25.7 |
| 0.5[1] | 10.2 | 2.5 | 2.7 | 4.4 | 2.7 | 0.8 | 23.3 |
| 0.75[1] | 11 | 2.8 | 3 | 5.1 | 3.2 | 0.8 | 25.9 |
| 1[1] | 9.7 | 2.6 | 2.8 | 4.5 | 2.8 | 0.9 | 23.3 |
| 2[1] | 5.6 | 1.4 | 1.6 | 2.4 | 1.4 | 0.5 | 12.8 |
| 3[1] | 5 | 1.2 | 1.7 | 2.8 | 1.5 | 0.7 | 12.8 |
| 4[1] | 2.5 | 0.5 | 0.6 | 1.5 | 1.1 | 0.6 | 6.7 |

[1] emission remaining measured after treatment

EXAMPLE 9

Propane, ethylene and hydrogen were continuously introduced into a loop reactor having a volume of 500 dm³. In addition, a polymerisation catalyst prepared otherwise according to Example 3 of WO 95/35323, except that the average particle size of the silica carrier was 25 μm, was introduced into the reactor together with triethyl aluminium so that the molar ratio of aluminium in the activator to titanium in the solid component was 15. The loop reactor was operated at 95° C. temperature and 60 bar pressure. Ethylene content in the fluid phase in the slurry reactor was 6.5% by mole and the ratio of hydrogen to ethylene was 450 mol/kmol. The production rate of polymer was 30 kg/h. The polymer produced in the loop reactor had an $MFR_2$ of 380 g/10 min and a density of 975 kg/m³.

The slurry was withdrawn from the loop reactor by using the settling legs and directed to a flash where the pressure was reduced to 3 bar. The polymer containing a minor amount of residual hydrocarbons was directed to a fluidised bed gas phase reactor, where also additional ethylene, 1-butene comonomer and hydrogen were added, together with nitrogen as an inert gas. The gas phase reactor was operated at a temperature of 85° C. and a pressure of 20 bar. The ethylene partial pressure in the fluidising gas in the reactor was 3.5 bar, the hydrogen to ethylene ratio was 15 mol/kmol and the ratio of 1-butene to ethylene was 280 mol/kmol. The production rate of the polymer in the gas phase reactor was 38 kg/h, so that the production split between the loop and gas phase reactors was 44/56. The total production rate was thus 68 kg/h.

The polymer was mixed with 2000 ppm of Irganox B561 and 2000 ppm of calcium stearate and extruded into pellets in a counterrotating twin-screw extruder JSW CIM90P. The polymer pellets had a density of 944 kg/m³ and an $MFR_5$ of 0.85 g/10 min. Into the pellets was then added a carbon black masterbatch so that its amount was 5.75% of the total composition and pelletised. The used carbon black masterbatch has been prepared by compounding 58.6 wt. % LDPE, 39.5 wt. % carbon black and 1.9 wt. % of Irganox 1010 (distributed by Ciba). The carbon black masterbatch has an $MFR_{21}$ of 14 g/10 min.

The resulting pellets were subjected to boiling water as described in Example 7 except that the ratio of water to pellets was 20. The results are shown in table 5 below.

TABLE 5

| | water/pellets 20:1 | | | | | | | |
|---|---|---|---|---|---|---|---|---|
| Time (h) | <C6 µg/g | C6-C7 µg/g | C8-C9 µg/g | C10-C11 µg/g | C12-C13 µg/g | C14-C15 µg/g | ≥C16 µg/g | Tot µg/g |
| 0 | 0.5 | <0.5 | 9 | 17 | 11 | 4.2 | 1.7 | 43.4 |
| 1[1] | <0.5 | <0.5 | 3.1 | 6.7 | 4.8 | 2.7 | 1.5 | 18.8 |
| 2[1] | <0.5 | <0.5 | 1.8 | 4.2 | 3.4 | 2.4 | 1.5 | 13.3 |
| 3[1] | <0.5 | <0.5 | 0.7 | 2 | 1.9 | 1.7 | 1.3 | 8.1 |
| 4[1] | <0.5 | <0.5 | 0.5 | 1.2 | 1.4 | 1.4 | 1.2 | 6.3 |
| 5[1] | <0.5 | <0.5 | <0.5 | 0.7 | 0.9 | 1.2 | 1.2 | 4.6 |
| 6[1] | <0.5 | <0.5 | <0.5 | <0.5 | 0.6 | 1 | 1.2 | 3.3 |

[1] emission remaining measured after treatment

EXAMPLE 10

The procedure of Example 9 was repeated except that the process conditions in the gas phase reactor were adjusted to obtain a polymer with a density of 950 kg/m$^3$ and MFR$_5$ of 0.24 g/10 min. Further, the ratio of water to pellets was 10. The results are shown in table 6 below.

TABLE 6

| | water/pellets 10 | | | | | | | |
|---|---|---|---|---|---|---|---|---|
| Time (h) | <C6 µg/g | C6-C7 µg/g | C8-C9 µg/g | C10-C11 µg/g | C12-C13 µg/g | C14-C15 µg/g | ≥C16 µg/g | Tot µg/g |
| 0 | <0.5 | <0.5 | 1.8 | 6.1 | 7.2 | 4.2 | 1.9 | 22.1 |
| 1[1] | <0.5 | <0.5 | 0.5 | 2.6 | 3.7 | 2.6 | 1.5 | 11.6 |
| 2[1] | <0.5 | <0.5 | 0.6 | 2.3 | 2.7 | 2 | 1.3 | 9.3 |
| 3[1] | <0.5 | <0.5 | 0.6 | 1.4 | 2 | 1.7 | 1.2 | 7.3 |
| 4[1] | <0.5 | <0.5 | <0.5 | 1.2 | 1.3 | 1.6 | 1.3 | 6.4 |
| 5[1] | <0.5 | <0.5 | <0.5 | 0.6 | 0.8 | 1.3 | 1.2 | 4.9 |
| 6[1] | <0.5 | <0.5 | <0.5 | <0.5 | <0.5 | 0.7 | 0.8 | 2.7 |

[1] emission remaining measured after treatment

The invention claimed is:

1. A process for removing volatiles from plastic material, comprising
   a) providing a pelletizer adjacent to an extruder, the pelletizer comprising an underwater cutter;
   b) providing a liquid to the pelletizer and pelletizing the plastic material to form pellets in the liquid, thereby forming a pellet slurry;
   c) transporting the pellet slurry to a treatment tank or a group of treatment tanks, wherein the treatment tank or each treatment tank in the group of treatment tanks comprises an overhead compartment;
   d) in the treatment tank or the group of treatment tanks, keeping the pellets for 15 minutes to 6 hours in the liquid at $T_b-25°$ C. to $T_b$ of the liquid, wherein $T_b$ is the boiling point of the liquid at the applied pressure;
   e) injecting a gas stream directly into the overhead compartment of the treatment tank or each treatment tank in the group of treatment tanks, whereby the gas stream is an air stream or an inert gas stream;
   f) removing the pellets from the liquid; and
   g) finally drying the pellets;
   wherein the liquid is water,
   the plastic material is a polyolefin, and
   the pellets obtained in the underwater cutter remain in the same liquid from the extruder through the treatment tank.

2. The process according to claim 1, wherein the process is carried out at a pressure such that the water has a temperature of 75 to 160° C. and is present in liquid form.

3. The process according to claim 1, wherein the liquid/plastic material weight ratio is within the range of from 3/10 and 300/10.

* * * * *